United States Patent [19]

Minnich

[11] Patent Number: 5,101,085
[45] Date of Patent: Mar. 31, 1992

[54] HIGH DIELECTRIC CONSTANT MATERIAL TO SHAPE ELECTRIC FIELDS FOR HEATING PLASTICS

[75] Inventor: Stephen Minnich, Schenectady, N.Y.

[73] Assignee: General Electric Company, Schenectady, N.Y.

[21] Appl. No.: 742,986

[22] Filed: Aug. 9, 1991

Related U.S. Application Data

[63] Continuation of Ser. No. 587,509, Sep. 25, 1990, abandoned, which is a continuation of Ser. No. 396,196, Aug. 21, 1989, abandoned.

[51] Int. Cl.⁵ .............................................. H05B 6/54
[52] U.S. Cl. ............................... 219/10.81; 219/10.75; 264/26; 425/174.8 E
[58] Field of Search ............... 219/10.81, 10.75, 10.43, 219/10.41, 10.55 F, 10.55 R; 264/26; 425/174.8 R, 174.8 E, 174

[56] References Cited

U.S. PATENT DOCUMENTS

| | | | |
|---|---|---|---|
| 1,934,704 | 11/1933 | Golden | 219/10.81 |
| 2,407,833 | 9/1946 | Jablonsky | 264/26 |
| 2,421,101 | 5/1947 | Lakso | 219/10.81 |
| 2,565,161 | 8/1951 | Wilmotte et al. | 219/10.81 |
| 2,609,482 | 9/1952 | Young | 219/10.81 |
| 2,708,703 | 5/1955 | Cunningham et al. | 219/10.81 |
| 2,856,497 | 10/1958 | Rudenberg | 219/10.55 E |
| 2,866,063 | 12/1958 | Rudd | 219/10.81 |
| 4,640,280 | 2/1987 | Sterzer | 219/10.55 F |

*Primary Examiner*—Philip H. Leung
*Attorney, Agent, or Firm*—Patrick R. Scanlon; James C. Davis, Jr.; Paul R. Webb, II

[57] ABSTRACT

Apparatus for heating a plastic sheet uses a high dielectric constant material (HDCM) to shape an RF electric field to be either concentrated or uniform as desired depending upon the object to be formed from the sheet. Electrodes can be annular with a circular or elliptical cross-section or be plates or wires, and can be disposed in the HDCM or exterior of the HDCM. A process for heating a plastic material comprises generating an RF field and shaping the field near the material using high dielectric constant members.

17 Claims, 2 Drawing Sheets

HIGH DIELECTRIC CONSTANT MATERIAL TO SHAPE ELECTRIC FIELDS FOR HEATING PLASTICS

This application is a continuation of application Ser. No. 07/587,509, filed Sept. 25, 1990, now abandoned, which is a continuation of application Ser. No. 07/396,196, filed Aug. 21, 1989 and now abandoned.

BACKGROUND OF THE INVENTION

The present invention relates to using a high dielectric constant material to shape an electric field, and more particularly, a heating apparatus and method for heating plastic that incorporates such a material.

It is known to use RF (radio frequency) fields to soften plastic sheet materials, which materials are then formed by a mold into a desired shape. FIG. 1 shows a typical prior art apparatus for doing this. In particular, an RF generator 10, which typically provides a 10 to 100 MHz signal, is coupled to a pair of circular electrodes 12a and 12b. In turn, an RF field is created between circular (or other shape) cross-section electrodes 12 as indicated by field lines 14, which field passes through a sheet of plastic workpiece material 16. Sheet 16 typically has a thickness between about ⅛ to ¼ inch (0.3175 to 0.635 cm). Such an apparatus heats most of sheet 16, although as can be seen by the spacing of field lines 14, not in a uniform manner. Thereafter sheet 14 is placed in male and female molds and pressed into the desired shape.

Frequently it is necessary to deform only a portion of the material in order to achieve the desired shape. Thus heating of the entire sheet is wasteful of the heating energy. Further, when the entire sheet is heated, the entire sheet must be supported since it is soft. Also incomplete female mold filling can result due to cooling of plastic, thereby making the molding of complex shapes difficult. A technique for localized heating that avoids some of these problems is to blow hot air just at the portions to be heated. However, the heat must then conduct through the plastic thickness before molding, which increases cycle time.

In contradistinction, in order to make some products, it is necessary to use a highly uniform RF field to achieve uniform softening. The typical prior art RF heating device of FIG. 1 undesirably concentrates the RF field at the portion of sheet 16 that is directly between electrodes 12.

It is therefore an object of the present invention to have an apparatus and method for RF heating of a plastic sheet wherein the RF field can be uniformly applied or locally applied, as desired, can make molding of complex shapes practical, and has a relatively short cycle time.

SUMMARY OF THE INVENTION

Apparatus in accordance with the invention for heating a plastic material comprises a radio frequency generator; a pair of electrode means coupled to said generator and disposed adjacent to the material for providing an electrical field thereto; and means for shaping said field comprising at least one high relative dielectric constant member disposed between the plastic material and one of said electrode means.

A method in accordance with the invention for heating a plastic material comprises generating a radio frequency field; and shaping said field proximate the material using at least one high dielectric constant member.

BRIEF DESCRIPTION OF THE DRAWING

In the drawing corresponding elements have been given corresponding reference numerals.

DETAILED DESCRIPTION

Figure 2:
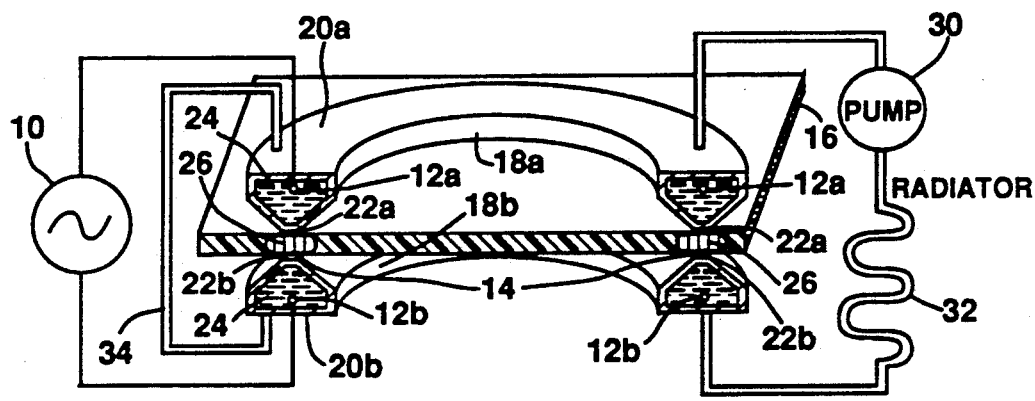
FIG. 2 is a partly cross-sectional and partly isometric view of a first embodiment of the invention for localized heating.

In FIG. 2 is shown field shaping means comprising containers 18a and 18b, such as glass or an RF insensitive plastic. Containers 18 have a full circular shape when seen in a top or bottom view and have wide ends 20a and 20b adjacent interior annular electrodes 12a and 12b, respectively, and narrow ends 22a and 22b adjacent workpiece material 16. Workpiece 16 can be a plastic such as polytetrafluoroethylene sold under the trademark "Teflon" by E. I. Dupont Co., Inc. Wilmington, Del., the poly-carbonate thermoplastic sold under the trademark "Lexan", the mixture of high impact polystyrene and polyphenylene sold under the trademark "Noryl", both by General Electric (GE) Co. Pittsfield, Mass., a polyolefin, etc. By positioning electrodes 12 inside containers 18, electrical field stress thereat is reduced.

Within containers 18 is a high dielectric constant material (HDCM) 24, such as a liquid, e.g., an alcohol, ethylene glycol, etc. In particular, substantially pure water ($\epsilon_r = 80$) is a good choice. A cooling means, such as pump 30 and radiator 32, is present that takes a fluid cooling medium, e.g., water, oil, a gas etc., out of one of containers 18 and returns the medium to the remaining container 18 at one side thereof. The other sides of containers 18 are connected together by pipe 34 so that the medium flows between containers 18a and 18b.

HDCM 24 can also be a solid, e.g., calcium titanate, magnesium titanate, strontium titanate, aluminum oxide, titanium dioxide, glass, etc. Due to the low dielectric constant of glass ($\epsilon_r = 4$ to 8), there will be less field concentration. However, since the dielectric constant of glass depends upon its composition, it might be possible to design a composition with a high dielectric constant. In particular, barium titanate is a good choice ($\epsilon_r = 1143$). In general, the higher the dielectric constant and the lower the dielectric loss, the better the material is for use as a HDCM. Preferably, any material with a relative dielectric constant of at least 10 can be used. When using a solid HDCM 24, it can be possible that the losses therein can be low enough so that pump 30, radiator 32, and pipe 34 can be eliminated. Otherwise internal channels or passages can be disposed in HDCM 24 for passage of a cooling medium.

The effect of HDCM 24 is to concentrate the field lines 14 at a annular localized area 26 of workpiece 16 to provide localized heating and softening. Subsequently, workpiece 16 is placed in male and female molds and area 26 is stretched to make a desired object, e.g., a waste receptacle.

Figure 1:
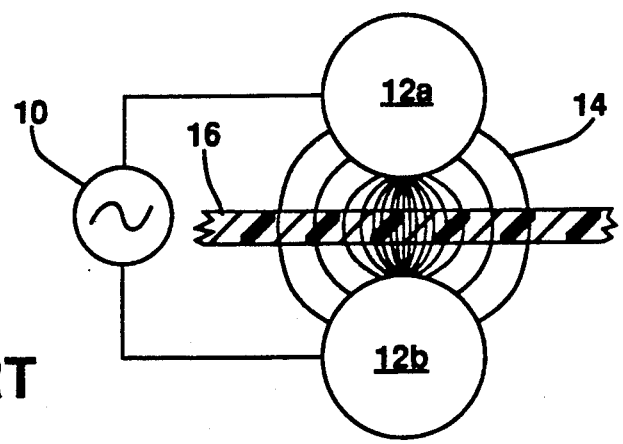
FIG. 1 is a schematic cross-sectional view of a typical prior are RF heating apparatus.
Figure 3:
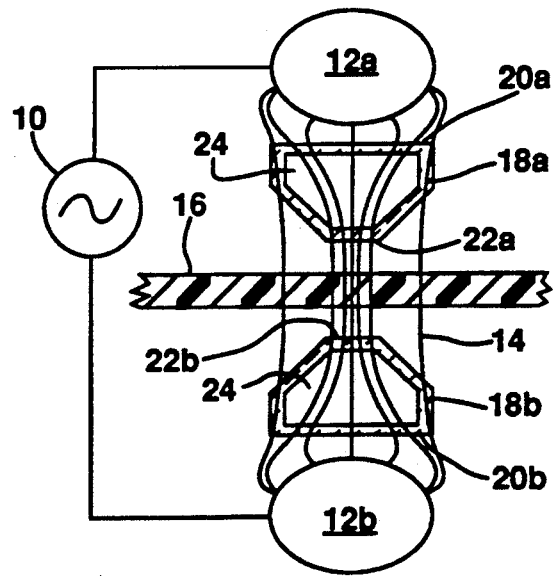
FIG. 3 is a cross-sectional view of a second embodiment of the invention for localized heating.

In the second embodiment of FIG. 3, electrodes 12 are shown as being elliptical in cross-section to provide a uniform field to wide ends 20 and disposed exterior of the containers 18. However, there may be an excessive field concentration at the sides of electrodes 12 where the radius of curvature is highest. If so, then circular electrodes as shown in FIG. 1 can be used.

Figure 4:
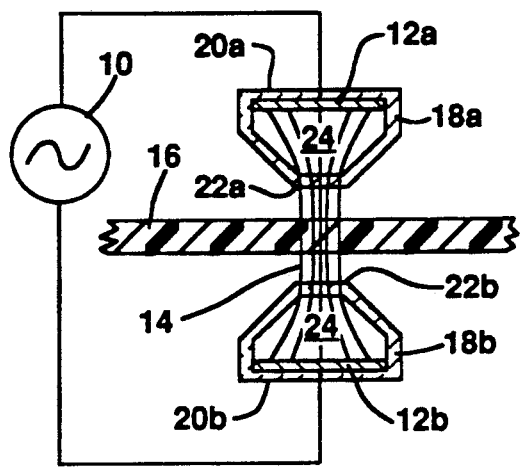
FIG. 4 is a cross-sectional view of a third embodiment of the invention with interior electrodes.

FIG. 4 shows that electrodes 12a and 12b comprise conductive plates respectively disposed in containers 18a and 18b. This can be done even if HDCM 24 is water since pure water is a good insulator. Also, because of the high dielectric constant, field stress concentrations are lowered. If desired, plates 12 can have rounded corners to reduce electric field concentration. Further, contoured electrodes, e.g., circular or elliptical as shown in FIGS. 1 and 3 can be used inside containers 18 of FIG. 4.

Figure 5:
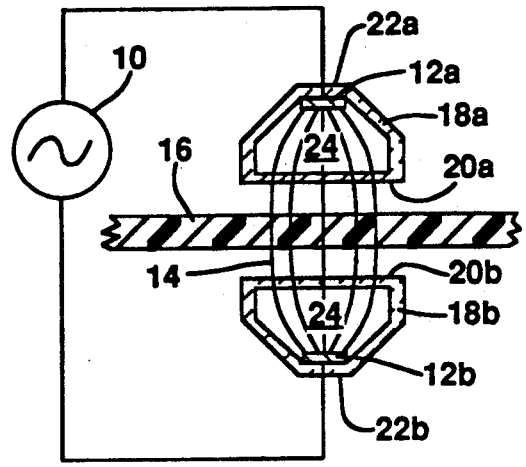
FIG. 5 is a cross-sectional view of a fourth embodiment of the invention for uniform heating.

FIG. 5 shows that containers 18 have their narrow ends 22a and 22b respectively disposed adjacent electrodes 12a and 12b, while their wide ends 20a and 20b are adjacent material 16. This achieves a nearly uniform field 14 for uniform heating of material 16. If desired, material 16 can be moving to obtain a still more nearly uniform field.

Figure 6:
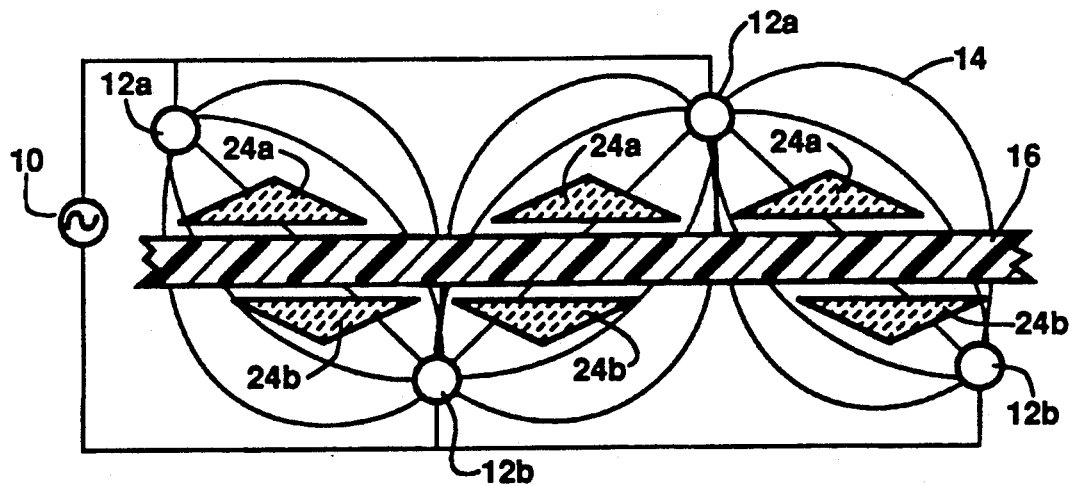
FIG. 6 is a cross-sectional view of a sixth embodiment of the invention for uniform heating.

FIG. 6 shows typical prior art "crossed-field" electrodes 12 comprising conductive rods extending parallel to workpiece 16. Such an arrangement has a lower capacitance compared to parallel plates. Although only four electrodes 12 are shown, in an actual embodiment more would normally be used. In the prior art, non-uniformities in the field produced by such electrodes are tolerated since workpiece 16 is a moving web, and thus all portions of workpiece 18 eventually are subjected to the same average field. However, if it is desired to heat a single stationary sheet this effect will not occur. The present invention makes the field more uniform by using HDCM field smoothing elements 24. In FIG. 6, HDCM elements 24 are shown as having a triangular cross-section. In practice they might have a more complex shape. The shape and location of elements 24 are determined by an analysis of the electric field produced by electrodes 12 in the presence of elements 24. The shape of elements 24 is iterated until the desired field distribution is obtained.

It will be appreciated that many other embodiments are possible within the spirit and scope of the invention. For example, since the dielectric constant of HDCM 24 is higher than that of workpiece 16, the electric field is lower there than anywhere else, including workpiece 16. Thus, higher loss materials, e.g., loss tangents between about 0.001 to 0.01, can be used for HDCM 24 as compared to materials typically used in capacitors where the electric field is strong everywhere. Further, the present invention is not limited to symmetrical configurations as described above. Other configurations are possible where a single HDCM member 24 is disposed on one side of workpiece 16. In this case it may be desirable to have the electrode 12 disposed on the other side of workpiece 16 configured as a flat plate to provide an electrostatic image.

What is claimed is:

1. An apparatus for heating a deformable workpiece of plastic material, said apparatus comprising:
   a radio frequency generator;
   first and second electrodes arranged relative to one another so as to define a workpiece retaining space therebetween where the workpiece of plastic material is positioned for heating, said first and second electrodes being coupled to said generator for producing an electric field in said workpiece retaining space; and
   means for shaping said field so as to provide a uniform field for localized heating of the workpiece, said means for shaping comprising first and second dielectric members corresponding to said first and second electrodes, respectively, and having a dielectric constant of at least ten, said first dielectric member being disposed between said workpiece retaining space and said first electrode and said second dielectric member being disposed between said workpiece retaining space and said second electrode, each of said dielectric members extending completely across its corresponding electrode without intersecting said workpiece retaining space.

2. The apparatus of claim 1 wherein each of said dielectric members has a narrow side adjacent to said workpiece retaining space and a wide side adjacent to its corresponding electrode.

3. The apparatus of claim 1 wherein each of said dielectric members has a narrow side adjacent to its corresponding electrode and a wide side adjacent to said workpiece retaining space.

4. The apparatus of claim 1 wherein each of said first and second electrodes has a circular cross-section.

5. The apparatus of claim 1 wherein each of said first and second electrodes has a elliptical cross-section.

6. The apparatus of claim 1 wherein each of said first and second electrodes is a plate.

7. The apparatus of claim 1 wherein each of said first and second dielectric members is a solid material.

8. The apparatus of claim 7 wherein said solid material is a titanate.

9. The apparatus of claim 8 wherein said titanate is barium titanate.

10. The apparatus of claim 1 wherein said radio frequency generator has a frequency between about 10 to 100 MHz.

11. The apparatus of claim 1 wherein each of said first and second dielectric members is a liquid material and said first dielectric member is disposed within a first container and second dielectric member is disposed within a second container.

12. The apparatus of claim 11 wherein said liquid material is substantially pure water.

13. The apparatus of claim 11 further comprising a pump connected to one of said containers, a conduit interconnecting said containers, and a radiator connected to said pump and the other one of said containers.

14. The apparatus of claim 11 wherein each of said first and second electrodes is disposed internally of said first and second containers, respectively.

15. The apparatus of claim 11 wherein each of said first and second electrodes is disposed externally of said first and second containers, respectively.

16. A method of heating a deformable workpiece of plastic material, said method comprising:
   disposing the workpiece to be heated between and spaced from a pair of electrodes adapted to provide a radio frequency field;
   generating the radio frequency field; and
   shaping said field proximate to the material using a dielectric member having a dielectric constant of at least ten to provide a uniform field for heating a localized area of said workpiece, said member extending completely across at least one of said electrodes without contacting said material.

17. The method of claim 16 wherein said shaping step comprises uniformly dispersing said field on the material.

* * * * *